A. T. BROWN.
TYPE WRITING MACHINE.
APPLICATION FILED APR. 21, 1902.

922,385.

Patented May 18, 1909.
8 SHEETS—SHEET 1.

WITNESSES=
K. V. Donovan.
Charles E. Smith

INVENTOR=
Alexander T. Brown
by Jacob Feibel
HIS ATTORNEY

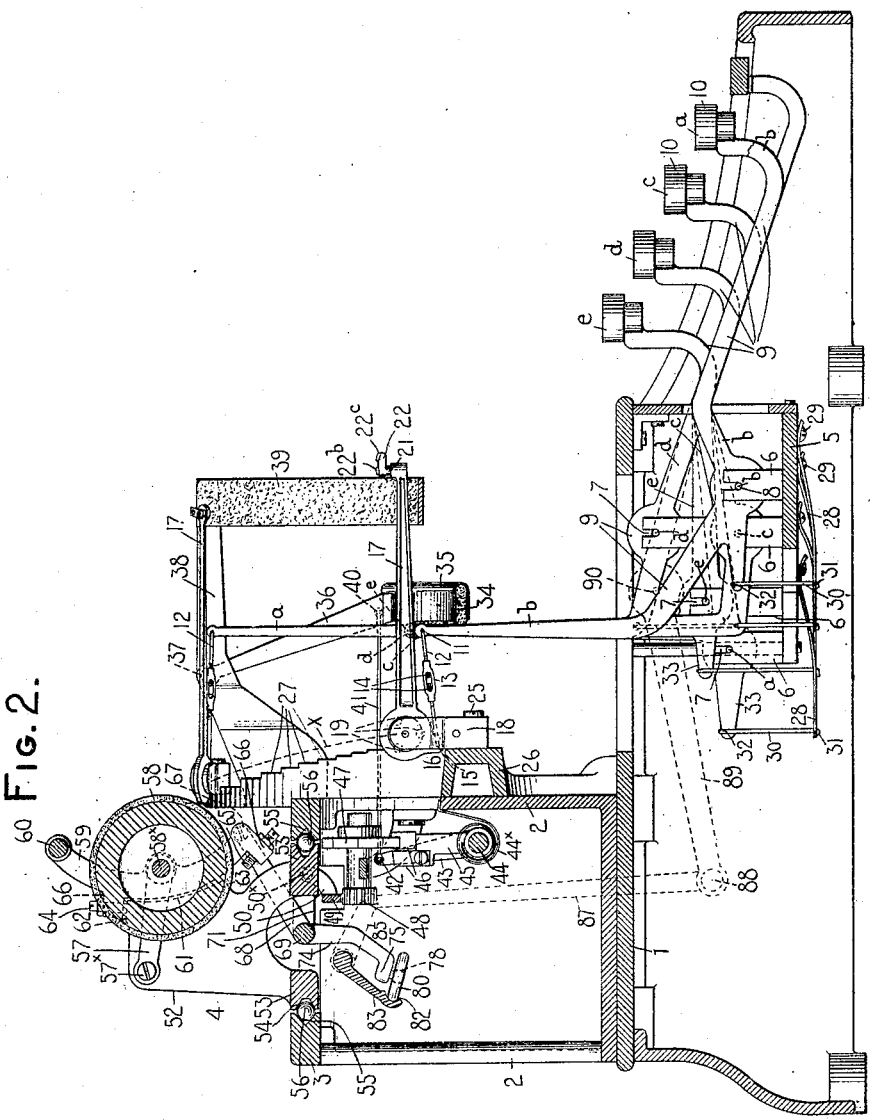

A. T. BROWN.
TYPE WRITING MACHINE.
APPLICATION FILED APR. 21, 1902.
922,385.
Patented May 18, 1909.
8 SHEETS—SHEET 3.
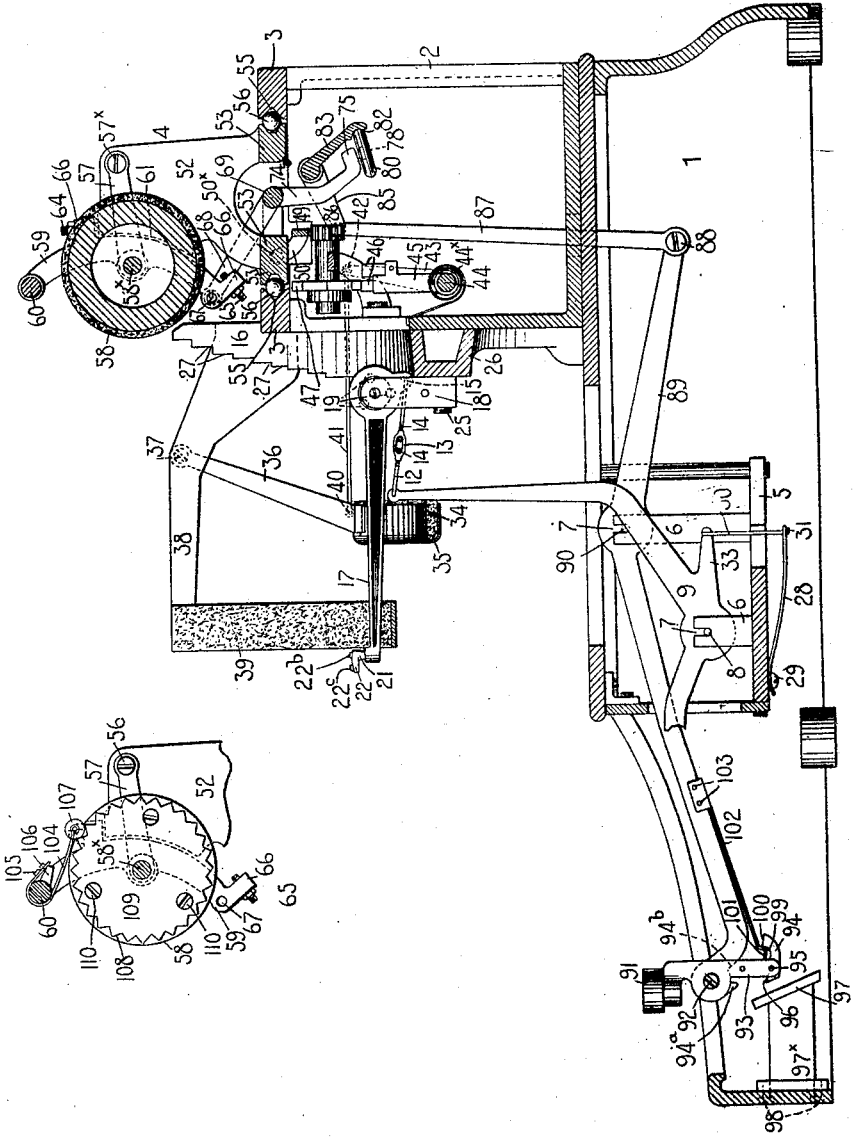
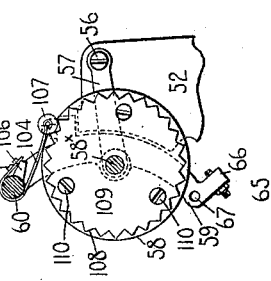
WITNESSES:
K. V. Donovan.
Charles E. Smith.
INVENTOR.
Alexander T. Brown
by Jacob Felbel
HIS ATTORNEY

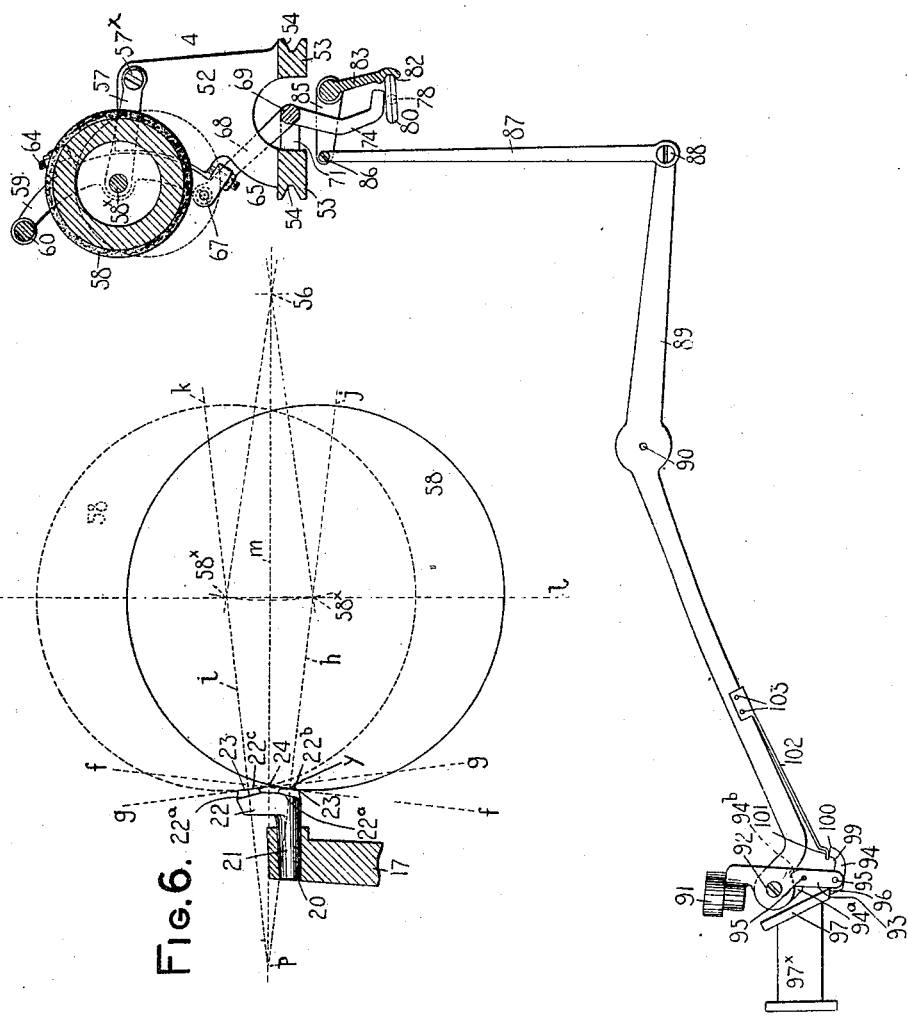

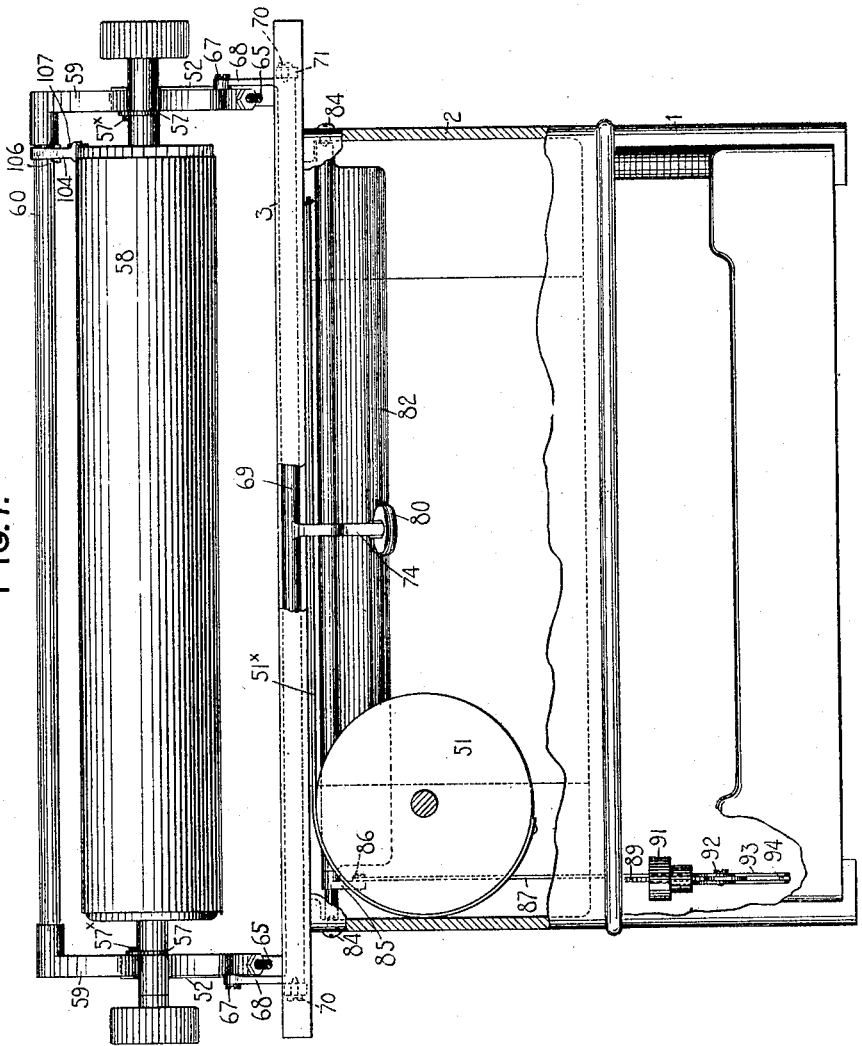

A. T. BROWN.
TYPE WRITING MACHINE.
APPLICATION FILED APR. 21, 1902.

922,385.

Patented May 18, 1909.
8 SHEETS—SHEET 6.

WITNESSES:
K. V. Donovan
Charles P. Smith

INVENTOR.
Alexander T. Brown
by Jacob Felbel
HIS ATTORNEY

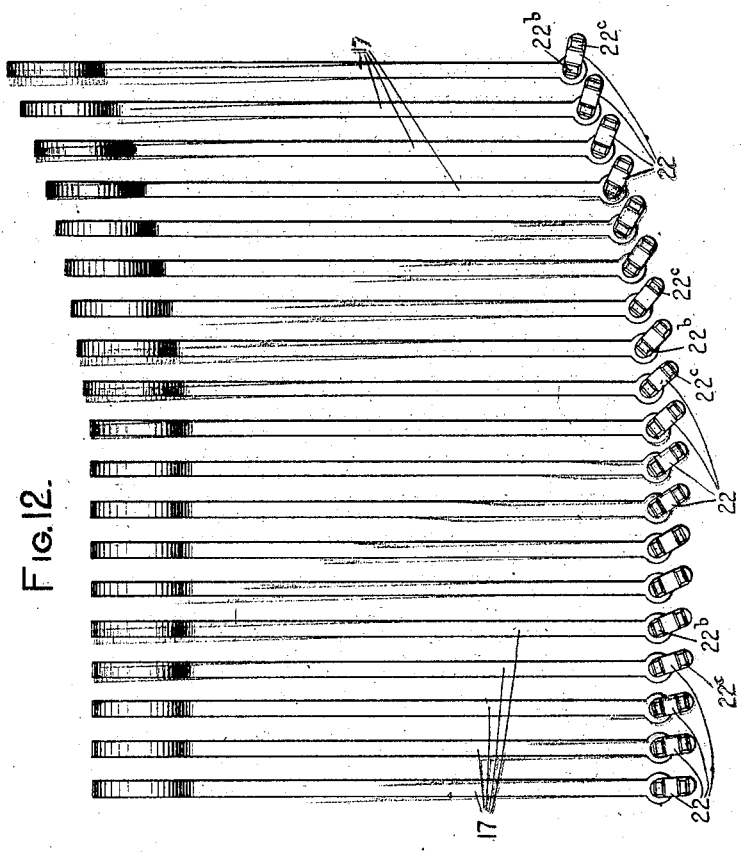

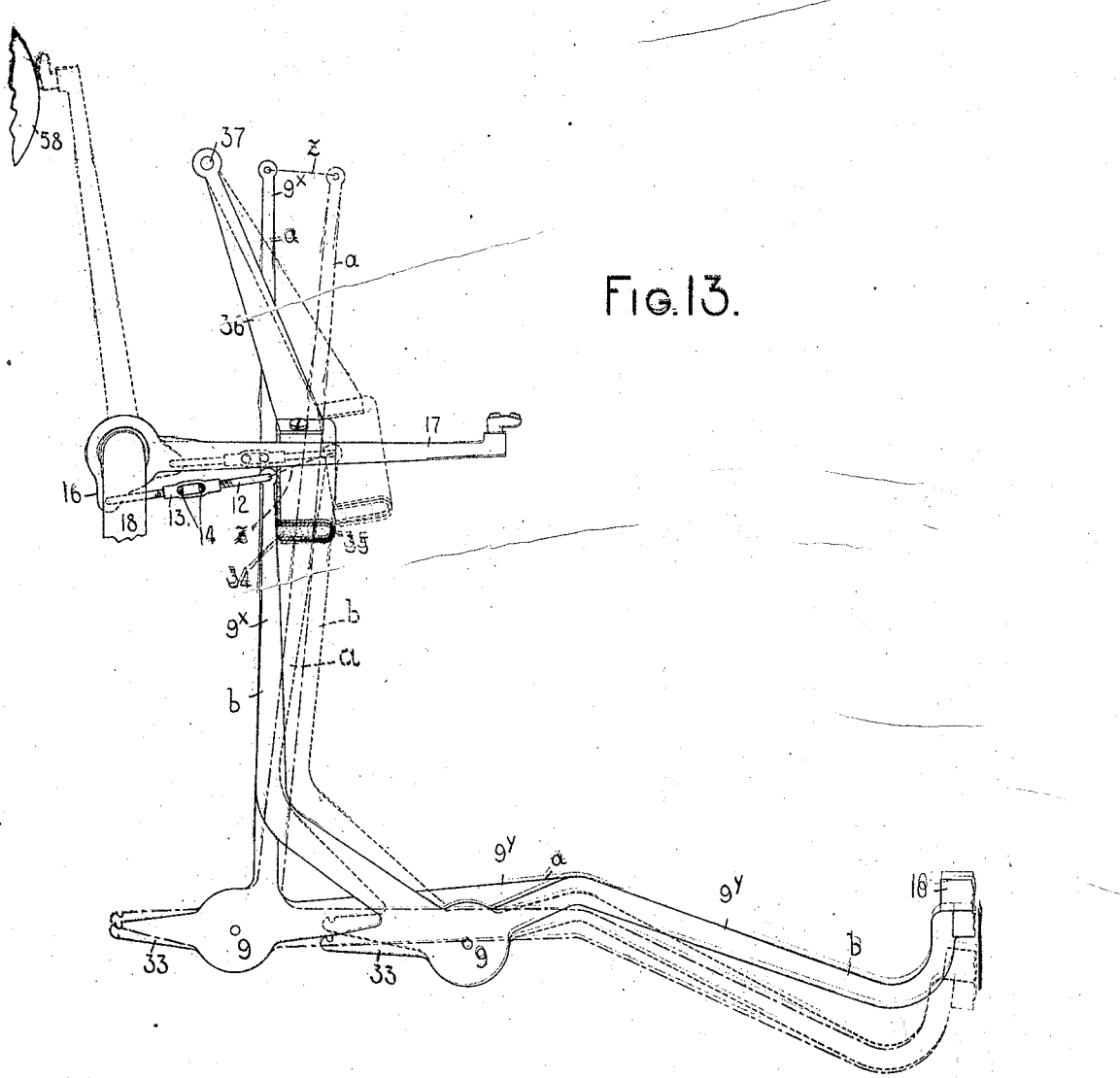

ively shaped and are each provided with

UNITED STATES PATENT OFFICE.

ALEXANDER T. BROWN, OF SYRACUSE, NEW YORK.

TYPE-WRITING MACHINE.

No. 922,385.  Specification of Letters Patent.  Patented May 18, 1909.

Application filed April 21, 1902. Serial No. 103,898.

*To all whom it may concern:*

Be it known that I, ALEXANDER T. BROWN, citizen of the United States, and resident of Syracuse, in the county of Onondaga and State of New York, have invented certain new and useful Improvements in Type-Writing Machines, of which the following is a specification.

My present invention in typewriting machines relates more particularly to the type actions, the manner of constructing and mounting the same, the mode of arranging or mounting the types on their blocks or bases and on the type bars or carriers, to means for varying the relation between the platen and the type carriers so as to change from one case to another, and to the universal bar and means coöperating therewith for actuating it.

One of the objects of my invention is to provide a typewriting machine wherein a large number of type carriers may be efficiently employed without making the bars unduly thin and weak and without increasing the size of the machine as a whole and wherein the liability of interference of adjacent type carriers is avoided or reduced to the minimum.

Another object of my invention is to so arrange the types on the type carriers that "cranking" action is reduced and an even and perfect imprint produced when either "case" is used.

A further object of my invention is to provide a machine in which a uniform leverage and key dip are obtained throughout the entire system of type actions.

A still further object of my invention is to provide means for affording a substantially uniform operation of the escapement or carriage feed mechanism by the operation of the different type actions.

To the above and other ends which will hereinafter appear, my invention consists in the construction, arrangements and combinations of parts hereinafter more fully described and particularly pointed out in the appended claims.

Figure 1:
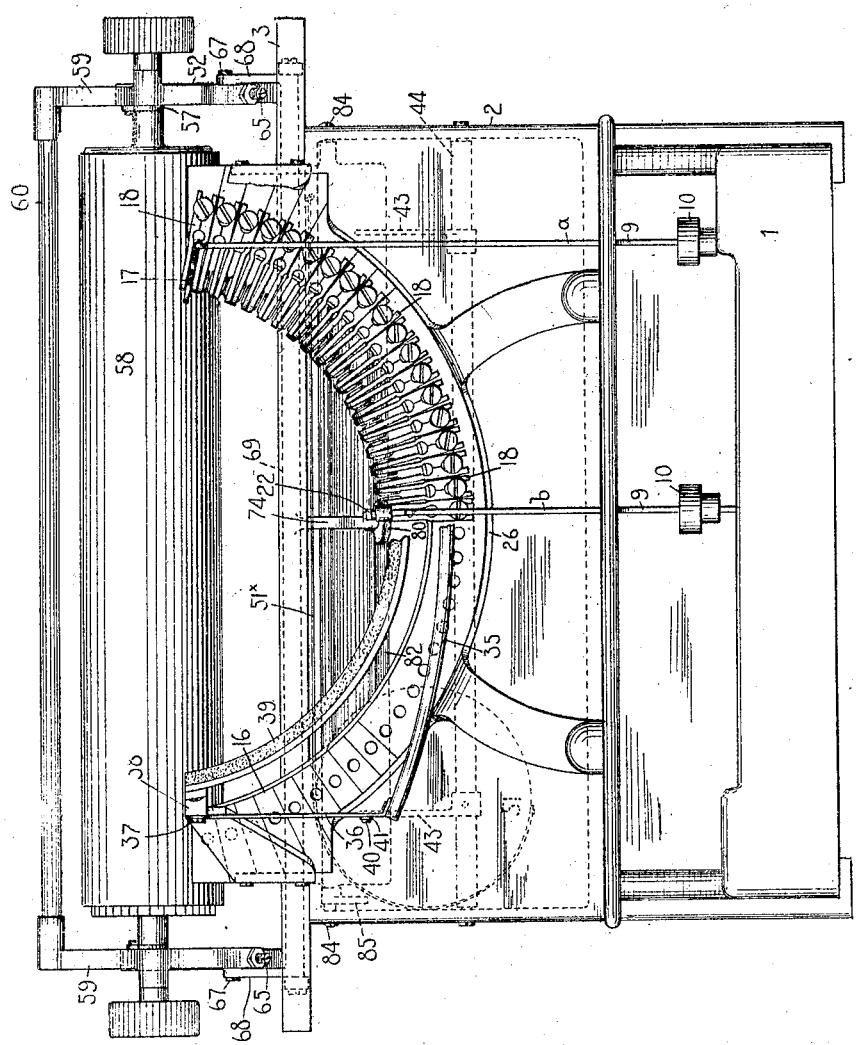
Figure 8:
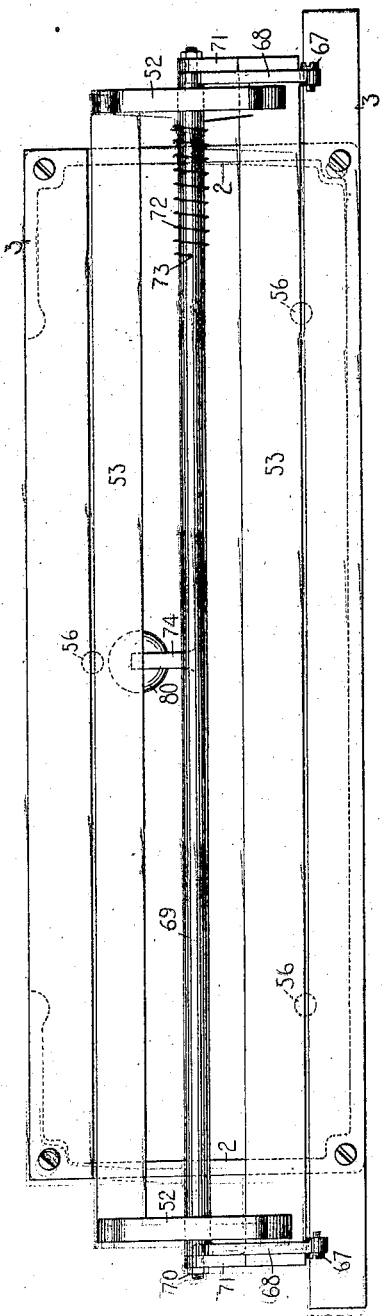
Figure 11:
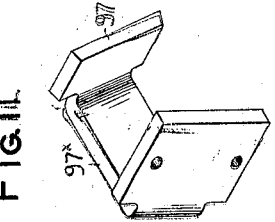
Figure 10:
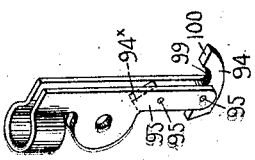
Figure 9:
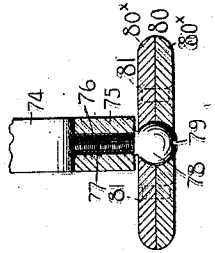

In the accompanying drawings wherein like reference characters indicate corresponding parts in the various views and in which parts are omitted or broken away: Figure 1 is a front view partly broken away and showing parts of a front strike writing machine embodying my improvements. Fig. 2 is a vertical front to rear central sectional view of the same. Fig. 3 is a vertical front to rear sectional view of the machine looking in the opposite direction from that of Fig. 2. Fig. 4 is a detail fragmentary end view partly in section of the platen, the platen frame and its connection with the carriage. Fig. 5 is a side elevation, partly in section, of the platen, platen frame, carriage and the platen shifting mechanism. Fig. 6 is a diagrammatic end view of the platen, the view illustrating the relation between the platen and the types on a type carrier in the different positions of the platen. Fig. 7 is a rear view of the machine with parts omitted and portions of the machine broken away. Fig. 8 is an enlarged detail top view of the top plate and the carriage with the platen frame omitted. Fig. 9 is an enlarged detail transverse sectional view of the shift-rail bearing-roller and its connection. Figs. 10 and 11 are detail perspective views of portions of the locking means for the platen shifting mechanism. Fig. 12 is a developed plan view of the type carriers on one side of the segment. Fig. 13 is a diagrammatic side view showing portions of two type actions and the universal bar.

My improvements are shown as embodied in a front strike machine and while certain features of the invention are particularly advantageous in so-called "visible" writing machines, whether it be a front strike or top strike machine, it should be understood, nevertheless, that some of my improvements may be employed in other types of machines.

The machine comprises a base 1 which supports a frame 2 that is surmounted by a top plate 3, on which the carriage 4 travels from end to end of the machine. Secured to the base 1 is a plate 5 that extends from side to side of the machine and supports the various pivot posts or studs 6 which extend upwardly to different heights and are disposed in different positions fore and aft of the machine, as illustrated in Fig. 2. Each of the posts has a slotted bearing 7 therein which is adapted to receive a pivot 8 that extends to opposite sides of each of the bell crank key levers 9. These key levers are variously shaped and are each provided with two lever arms that project substantially equal distances from the pivotal center of the lever. Thus the lever arms $9^x$ project upwardly, whereas the forwardly extending arms $9^y$ project forwardly from the pivots.

The forward end of each substantially horizontally disposed lever arm 9ʸ is provided with a finger key 10 whereas the opposite or upwardly extending arm of each lever is connected at its free end 11 to a link 12, which is preferably a two-part link, the separate parts being united by a turn-buckle 13 which coöperates with the oppositely threaded ends 14 of the separate parts of each link. The rear end of each link is connected at 15 to a downward extension 16 of a horizontal type bar 17, that may be mounted in any suitable manner upon a support or hanger 18. In the present instance I have illustrated a construction wherein antifriction balls 19 are interposed between a bearing on the hanger and an interior annular race in the hub of the type bar in a similar manner to that shown and described in the Patent No. 653,905 granted to me July 17, 1900. The type bars are straight throughout their lengths, that is to say, each type bar is devoid of lateral bends, considered with relation to its plane of movement, and the forward end of each type bar is perforated at 20 (see Fig. 6) for the reception of the tapering stem 21 of a type block 22, which on its outer or face side is inclined backwardly and outwardly on opposite sides of its center as seen at 22ᵃ. Each type block is provided with a plurality of types, two being shown in the present instance, and these types, 22ᵇ and 22ᶜ, have faces which are inclined forwardly and inwardly from the outer end portions 23 of the types to a point intermediate but forward of the types, which forward, intermediate point is indicated at 24 in Fig. 6. In other words, the faces of the types are inclined rearwardly and outwardly from a point intermediate and in front or forward of the types, toward their outer extremities or toward the ends of the type block, for purposes which will hereinafter more clearly appear. Otherwise stated, the planes (represented by the lines $f$ and $g$) of the faces of the types on each block or head are at an angle to each other and intersect in front or forward of the type faces at a point 24 which is on a line $m$ drawn forwardly about midway of the two types. From an examination of Fig. 12, it will likewise be seen that one of the types 22ᵇ on each type block is in line with the shank or stem 21 to which it is connected and this particular type in each case preferably is a lower case type. From this it will be seen that the lower case character on each type bar lies in the plane of movement of the bar itself and that all "cranking" action on the lower case characters is avoided, thus avoiding blurred and imperfect impressions.

By reason of the peculiar beveled or inclined arrangement of the faces of the types as illustrated in Fig. 6, I am enabled to place the types much closer together than heretofore and thus reduce the amount of offset or extent of cranking heretofore necessary in mounting several types upon a bar, and especially those bars which approach and are at the upper ends of the segment. For example it will be understood that if the faces of the types were both in the same plane or were inclined reversely to that shown, the types would have to be more widely separated in order to avoid the liability of a portion of one type printing when another on the same bar is leaving its impression. When, however, the faces of the types on the same bar are inclined backwardly away from each other in the manner represented in Fig. 6, a greater space is provided between the surface of the platen and the type on the bar which is not at the printing point when the other type is in printing position, and hence a relatively shorter shift of the line of print may be obtained without liability of both types printing at the same blow. Thus the close arrangement of the types on each type block not only reduces cranking action, thereby avoiding blurring when the offset type is printing but it likewise enables a reduced shifting movement at the printing point to be obtained without liability of a part of one type printing upon the platen when the other type on the same bar is printing. By this construction I am able to employ comparatively thick and rigid type bars which are straight throughout their lengths, that is to say, bars which at their type ends have no lateral or sidewise bends, but of course my improved types may be used with bars having such bends. The straight type bar avoids the liability of the type being deflected or "whipped" out of its proper course during a rapid or violent movement of the type bar to the printing position. This defect is particularly apparent in a thin sheet metal type bar having a lateral bend at its free end where the types are located.

Each of the hangers 18 is secured by a screw 25 to the forward face of a segment 26 which face is step-shaped and is so constructed that the various steps constitute bearings 27 for the hangers. These steps are in different parallel vertical planes extending different distances from the front or printing side of the platen. The planes of the step bearings for the upper or terminal hangers are nearer the platen than the planes of the bearings at and near the center of the segment, and these step bearings are progressively greater as they extend from the center of the segment to the terminal portions thereof. Upon reference to the dotted line $x$ in Fig. 2, it will be understood that this arrangement enables the pivotal centers of the various type bars to be situated in an inclined plane, and the type bars being of uniform length, it follows that they will extend different distances fore and aft of the machine; that is to say, the type bars at the center of the segment will be projected farther forward than those at the sides or terminal portions of the segment. By thus mounting the type bars it will be seen that although they are of equal lengths their type ends extend outwardly in a curve or in steps one beyond the other so that the laterally and angularly disposed or overlying types will be clear one of the other while at rest or in normal position. This avoids all clashing at the rest or basket and enables the bars to be set closer together, which means also that more bars may be employed in a machine of given dimensions than heretofore. This manner of mounting the type bars likewise provides what may be termed a skewed arc or an arrangement of the pivotal centers of the type bars in a compound curve; the arrangement of the type bars segmentally around the support forming a curvature in one direction and the arrangement of the type bar pivots fore and aft of the machine forming a slight curvature of the pivotal centers in another direction, as will be understood upon reference to Fig. 12 and also by an inspection of the line $x$ in Fig. 2.

Each of the bell crank key levers and the parts connected thereto are restored to the normal position by a leaf spring 28 which is secured at one end 29 to the under side of the plate-like support 5. The opposite free end of each spring is apertured for the reception of a link 30, the lower end of which is provided with a head 31 that affords a bearing for the spring. The upper end of each link is formed with a hook 32 which is seated in the recessed portion of an arm 33 that projects rearwardly from the bell crank lever. The tension of each spring 28 is exerted downwardly upon the arm 33 and tends to restore the key lever and type bar to their normal positions. The disposition of the pivotal centers of the various bell crank levers at different positions fore and aft of the machine and at different heights enables the lever arms of each bell crank lever to be made of the same or substantially the same length, considered from the terminal portions thereof to the fulcrum. The bell crank levers which connect with type bars at the center of the segment have the shortest arms and the bell cranks increase in size as they approach the terminals or upper portions of the segment. For instance, the bell crank key lever which is indicated by the letter $a$ in Fig. 2, connects with a type bar at one terminal of the segment and this lever is longer than any of the other levers intermediate it and the center of the segment, but the arms of this key lever project equal distances from its pivotal center. In order that this fact may be determined and also that it may be readily seen that the arms of each key lever are of equal length, the various key levers, their pivots and their pivot posts and associated parts in Fig. 2, are marked with corresponding letters; thus $a$ indicates the terminal key lever, its key and also its pivot post, etc. The letter $b$ designates one of the center key levers, its pivot posts, etc., and $c$, $d$ and $e$ each refer to a key lever which is connected with a type bar at on near the center of the segment. The pivotal center of each of these key levers is designated by the letter applied to the key lever itself.

The upright arms of the various bell crank levers are so bent or shaped that they lie in a single vertical plane or straight line transversely of the machine, notwithstanding the fact that they are pivoted at different points fore and aft of the machine or in different transverse planes.

Extending forwardly of the upright arms of the bell crank levers and in the path thereof is a curved pad 34 which is carried by a curved or segmental universal bar 35, the curvature of the bar being in the direction of the curvature formed by the free ends of the upright lever arms of the various key levers. The universal bar is rigidly secured at its ends to depending parallel links 36 which are pivoted at 37 to bracket arms 38 secured at each side of the segment and which brackets also constitute a support for the segmental pad, rest or basket 39 on which the type bars bear when in their normal positions. Connected to each link or arm 36 at 40 is a rearwardly extending link 41 that is attached at its rear end 42 to an upwardly extending arm 43 carried by a rock shaft 44 which extends throughout the width of the machine as shown in Fig. 1 and which is restored to normal position by the usual spring $44^x$. On said shaft is secured a dog rocker which is provided in the usual manner with feed dogs 46, which coöperate with an escapement wheel 47 that in turn is operatively connected to a feed pinion 48, which meshes with a feed rack 49 connected to arms 50 which are pivoted at $50^x$ to the carriage 4. The carriage is propelled by the usual spring drum 51 and intermediate strap or band $51^x$ (see Fig. 7).

It will be seen that a depression of any of the finger keys 10 will cause the upright arm of the associated bell crank lever to be moved toward the front of the machine, thereby moving the universal bar 35, which is in its path. The movement thus transmitted to the universal bar will be effective to vibrate the shaft 44, through the link and crank arm connection, and the carrier with its feed dogs will be vibrated forwardly of the machine. When the key is released the parts will be restored to normal position by their springs and the carriage will feed one letter space distance. Of course during the down stroke of the key its connected type bar is swung rearwardly to print.

The construction and arrangement of the type actions is such that a substantially uniform leverage is afforded throughout the system and a substantially uniform dip of all the keys is afforded and the escapement is actuated through the universal bar and the coöperating actuating lever arms $9^x$ in a substantially uniform manner by all of the keys. Thus while the upright lever arms extend to different heights and the upper ends thereof are situated in an arc, the upper ends of the arms nevertheless all move a uniform or substantially uniform distance fore and aft of the machine, as indicated by the lines $z$ in Fig. 13, though the upright lever arms extend different distances from their pivots and increase in length or height from the center to the sides of the system. This being the case, the angular movements of the lever arms decrease from the middle of the system to the ends or sides thereof; the shorter lever arms (as $b$ for instance) in the middle of the system having a greater angular movement than the longer upright lever arms at the ends of the system (as $a$ for instance). In order that the universal bar may be moved to substantially the same extent by all of the upright lever arms and thus afford a substantially uniform operation of the escapement mechanism, the universal bar is constructed so as to coöperate with the upright lever arms at points on said arms which move to substantially the same extent throughout the system and these points are at different elevations, or at elevations which increase from the center to the sides of the system of lever arms. The universal bar is curved upwardly from the middle toward the ends on a more or less circular line, the extent of curvature depending on different conditions. It is believed that the foregoing will be clearly understood from an inspection of Fig. 13, from which it will be seen that the finger key 10 of the lever $a$, having one of the longest upright arms, and the finger key of the lever $b$, having one of the shortest upright arms, are depressed to the same extent; that the upper ends of said upright lever arms move the same distance to swing the type bar to the printing position; that the angular movements of the two upright lever arms are different, but that nevertheless the universal bar is moved the same distance, or from the full to the dotted line position, by both of said upright lever arms.

From certain aspects of the present invention it is immaterial whether the upright lever arms $9^x$ constitute part of the key levers or not, since the operation of the upright lever arms to move the universal bar a uniform distance would be the same whether or not each upright lever arm constitutes a part of a key lever.

The carriage 4 comprises suitable end plates 52 which are united by longitudinal bars 53 that have ball grooves or ways 54 formed in their outer edges. The top plate 3 of the machine comprises two longitudinal bars provided with oppositely disposed grooves 55. Anti-friction balls 56 are arranged between the grooves 54 and 55 and support the carriage. Suitable pins or stops are provided to limit the endwise movement of the carriage with relation to the frame of the machine and also to keep the balls in the grooves. Pivoted to the carriage at $57^x$ are links or arms 57, the forward ends of which are perforated to encircle the shaft $58^x$ of the platen 58.

The platen frame comprises segmental end-plates 59 united at their upper ends by a cross bar 60. The end plates 52 of the carriage are recessed or curved at 61 to conform to the curvature of the end plates 59 of the platen frame. The end plates 52 of the carriage have abutments 62 and 63 for coöperation, respectively, with adjustable screw-stops 64 and 65 carried in interiorly threaded lugs 66 which project from the end plates 59 of the platen frame. These screw stops may be adjusted to vary the extent of upward and downward shift of the platen frame or to take up or compensate for any wear upon the stops, in order that the platen may be shifted to the proper position where the faces of the types will impact therewith on lines that are at substantially right angles to a line extending through the axis of the platen, as is clearly indicated by the dotted lines $f$, $g$, $h$, $i$ in Fig 5. In other words, as will be seen at Fig. 6, in the lower and upper case positions of the platen the plane of each type face on each bar when in printing position, is at substantially right angles to a line radiating from the axis of the platen to the printing point. The lower ends of the end plates 59 are pivoted at 67 to crank arms 68 which project from a rock shaft 69 that extends transversely across the machine and is supported in screw bearings 70, which extend through bracket arms 71 that project from the carriage, as indicated in Fig. 8. Surrounding this shaft is a coiled spring 72, which at one end 73 is secured to said shaft. The opposite end of the spring bears upon the carriage so that tension of the spring is exerted upon the rock shaft 69 in a direction to counterbalance the weight of the platen and platen frame. The construction and arrangement is such that when the rock-shaft 69 is turned the platen frame will receive a movement around two centers, one the pivots $57^x$ of the links 57 and the other the axis or shaft $58^x$ of the platen. Depending centrally from this rock shaft 69 is an arm 64 that has a lateral bend 75 formed with a screw-threaded aperture 76 (see Fig. 9). This aperture receives the threaded stem 77 of a ball member 78 which may be provided upon its outer face with a screw driver nick 79. Bearing upon this ball member is a wheel or roller 80, which consists of two separate parts 80× united by screws 81 that extend through openings therein and not only unite the plates together but likewise connect the roller formed thereby with the ball member 78. To assemble the parts it is merely necessary to project the threaded stem through the central opening in one of the plates or sections 80× and then screw the two plates together, with the ball 78 within the socket formed by the central half round apertures in the plates. After the plates have been united by the screws 81, the threaded stem 77 may be connected to the depending arm 74. The roller formed by the plates 80× is thus united to the arm 74 by a ball and socket or universal joint which affords an easy movement, free from binding during the shifting of the platen. The tread of the roller is adapted to bear in a groove 82 in a vibratory plate or bar 83 that is pivoted in screw bearings 84 carried by the frame of the machine (see Fig. 7). The reduced portion of the bar or plate near one end thereof is provided with a crank arm 85 that is rigidly secured to what may be considered the shaft or pivot of this shift plate or bar 83. The outer or free end of the crank arm 85 is pivoted at 86 to an upwardly extending link 87 that has its lower end pivotally connected at 88 to a bell crank lever 89 that is pivoted at 90 and has a lever arm projecting forwardly to the keyboard of the machine, as illustrated in Fig. 3, where it is provided with a key 91, that is pivoted thereto at 92 so as to have a movement independent of the shift lever 89. The key 91 comprises a head or button and a folded or two-ply sheet metal stem or shank 93, as seen clearly at Fig. 10. A pawl or catch 94 is rigidly secured at 95 at the lower end of said stem and between the jaws or plates thereof. The upper end 94× of the pawl or catch 94 is adapted to coöperate with stop faces 94ª and 94ᵇ of the key lever and thus limit the movement of the key 91 and its stem 93 with relation to the key lever. Said catch 94 has an inclined end 96 that coöperates, under circumstances to be hereinafter described, with a rigid abutment 97 which extends from a bracket 97× secured at 98 to the base of the machine. This rigid abutment has an inclined face that corresponds to the inclined face of the catch 94. The catch is likewise provided with a recess 99 and a flat face 100, with both of which the hooked end 101 of a leaf spring 102 is adapted to coöperate, the leaf spring being secured at 103 to the shift key lever.

When the parts are in the normal position the hook-like end 101 of the leaf spring will be seated in the recess of the pawl 95, and maintain the finger key and stem in a position relatively to the key lever such as is represented in Fig. 3, so that a downward depression on the finger key at this time will merely result in the shifting of the platen and when pressure on the key is released the shift key lever will be restored to the normal position. When, however, it is desired to write all upper case characters or to maintain the platen in the upper case position for some time, the finger key is depressed in the usual manner and then given a movement around its pivot 92 toward the rear of the machine so that the catch 95 will be released from the hook-like end of the leaf spring 102 and its nose or end 96 brought beneath the fixed abutment as represented in Fig. 5. The key will remain in this position until it is given a slight forward movement around its pivot 92, which is effective to withdraw the nose of the catch from engagement with the abutment 97, and the hook-like end 101 of the leaf spring will then be again seated in the recess 99 in the pawl and the finger key will be maintained in its normal position with relation to the shift key lever until the finger key is again pressed toward the rear of the machine. If the finger key should accidentally be given a forward movement during a portion of the down stroke of the shift lever no harm will result because the inclined end of the catch 94 will be brought to bear against the inclined face of the fixed abutment. If a continued downward and rearwardly directed pressure is exerted upon the finger it will result in the lever being locked when it is fully depressed so that only a single movement is required.

A leaf spring 104 is attached by screws 105 to a lug 106 projecting from the platen bar 60. The free end of this spring is provided with a detent roller 107 which coöperates with the teeth 108 of a line-space ratchet wheel 109 that is secured to one end of the platen by screws 110. This spring detent not only performs the usual functions of such detents but it likewise insures the proper positioning of the platen with relation to the faces of the types during the shifting movement; in other words, it maintains a fixed relationship between the platen and its frame so that at the completion of the shifting action the line of print will be brought to the proper plane to receive the next type impression in alinement with the letters previously written. If there were no means for holding the platen relatively to its frame, there would be a slight motion of the platen relatively to the frame if the shift key should be violently actuated and hence the line of print would not register with the printing point and the type would print off the line.

A depression of the shift key 91 rocks the shaft 69 and this transmits through the crank arms 68 a movement to the platen frame around the center 57×. During this movement, however, the platen frame receives a movement which is substantially coincident with the curvature of its end plates so that the cross bar 60, during a shifting movement from the lower to the upper case position, will be moved upwardly and forwardly and will cause the platen to receive a slight rotary movement around its axis by reason of the detent which is carried by the bar, though a fixed relation is maintained between the platen and platen frame. From an examination of Fig. 6, it will be seen that the effect of these movements is to cause the platen to receive a greater extent of movement at its axis of revolution and at that side of the platen opposite the printing point during the shifting operation, than it does at the printing point side. Thus a given point on the rear face of the platen represented at $j$ for instance will be moved when the platen is shifted to a point represented at $k$, whereas a given point represented at $y$ for instance on the forward or printing face of the platen receives only a movement represented by the distance between the lines $h$ and $i$, where these lines cross the printing faces of the types. It will be noted that when the platen is in the lowermost position, the face of the lowermost or lower case type on the type bar strikes the face of the platen above a horizontal line extending through the axis of revolution thereof whereas when the platen is shifted to the raised position, the uppermost type or upper case type impacts with the face of the cylinder at a portion thereof which is below a horizontal plane passing through the axis of the platen. It will be seen that the platen is shifted transversely around the center 56 and simultaneously rotated about its own axis so that the printing face is given a much shorter movement than its axis and one which is just equal to the distance between the centers of the types upon the type bars. The effect of the shifting devices upon the face of the platen is the same as though the platen carrier were pivoted on its front side at the point $p$. This peculiar movement afforded the platen during the shifting thereof is rendered necessary by reason of the peculiar arrangement of the type faces and therefore in one sense the shifting mechanism may be regarded as essential in connection with type carriers having faces inclined in the manner shown and described. But in so far as the arrangement of the types is concerned, it will be understood that the type bar system may be shifted instead of the platen; and also that in so far as concerns the arrangement of the type bars, there may be only one type on each bar and hence no shift of the platen. By examining Fig. 6, it will be seen that the type faces (which may be curved to match the curvature of the cylindrical platen) impact with the platen, whether it be in the upper or lower case printing position, in planes ($f$ or $g$) which are at angles to a horizontal plane. In a front strike machine this horizontal plane is indicated by the dotted line $m$. If the invention be applied to a top strike or a bottom strike machine, then the planes of impact between the printing faces of the type and the platen will still be in planes which are at angles to a horizontal plane. This is clearly represented by turning Fig. 6 so that the type bar will be beneath the platen to represent a bottom strike machine. In this case the horizontal plane is represented by the dotted line $l$. For a top strike machine, it is merely necessary to reverse this figure so that the type bar will appear on top of the platen and the horizontal plane is still represented by the dotted line $l$. It will also be observed from an examination of Fig. 6 that both type faces impact with the platen at angles to a vertical plane. In a front strike machine, the vertical plane would be represented by the dotted line $l$, and if the figure be turned so as to represent the type bar beneath the platen as in an under strike machine, then the vertical plane would be represented by the dotted line $m$. This line $m$ would likewise represent a vertical plane, should the figure be reversed so that the types strike on the upper portion of the platen. It will therefore be seen that the faces of the types impact with the platen on planes which are at angles to a vertical plane, as well as at angles to a horizontal plane, whether the invention be embodied in a top strike, front strike or under strike machine. The machine of course may be constructed so that the types strike the platen on the front side at any portion of the upper forward quadrant thereof.

The type blocks may be stemless and may be soldered or otherwise secured to the bars. The pivots of the type bars may be of the ball bearing type shown or of any known or suitable construction. It will be noted that the type bars are of equal length; that they are arranged in segmental form with their pivots stepping outwardly or forwardly gradually from the extremities of the segment toward the middle thereof, so that the pivots are arranged at an angle to the plane of the segment or segmental support in which the type bars are mounted; that the stepping of the type bar pivots causes such pivots to lie in different parallel planes transversely of the machine and which are at different distances from the face of the platen or the plane in which said face lies; that the pivots of the type bars at the upper ends of the terminals of the segment lie in planes which are nearest the front side of the platen, while those pivots which are at or near the middle of the segment lie in planes which are farther removed from the plane of the face of the platen; that the type bars are arranged in a single continuous series, and owing to the stepping of their pivots and to the fact that the bars are of uniform length, said bars terminate at their type ends in different vertical planes, considered transversely of the machine, or at different distances from the vertical plane of the face of the platen and have a downwardly and outwardly step-shaped arrangement at their type ends from the upper to the lower portions of the segment; that each type block or bed has an upper case type and a lower case type inclined one to the other; that the planes of the faces of these types intersect at a point beyond and forward of the face of the type block or bed; that the lower case type of each type bar is situated in the plane of the type bar and is directly over the stem of the type block by which the latter is attached to the bar; that the upper case portion of the type block is offset from said plane; that the platen is mounted so as to be shifted simultaneously both transversely and rotatively so that the printing point or line is shifted only the distance from center to center of the two types on one bar while all other portions of the platen are shifted greater distances; and that the faces of the types strike the platen on planes which are at angles to a horizontal plane and to a vertical plane.

Various other features of construction and arrangement have hereinbefore been pointed out, and perhaps need not be repeated here.

Changes in details of construction and arrangement may in some instances be made without departing from the spirit of my invention and some of the features of improvement may be used in some machines without others.

Certain features shown and described are not claimed herein but constitute the subject-matter of divisional applications.

What I claim as new and desire to secure by Letters Patent, is:—

1. In a typewriting machine, the combination of a platen and a type-bar, a plurality of types on said bar, the faces of which impact with the platen in different planes that are at angles to a horizontal plane, the said faces being inclined rearwardly and outwardly from a point intermediate and in front of the types.

2. In a typewriting machine, the combination of a platen, a type bar, a plurality of types on said bar, the faces of which impact with the platen in planes that are at angles to a horizontal plane, the said faces being inclined rearwardly and outwardly from a point intermediate and in front of the types, key actuated means for moving said type bar, and means for shifting the platen for upper and lower case printing, the center of rotation of said platen receiving a greater extent of movement than that portion thereof which is at and adjacent to the printing point.

3. In a typewriting machine, the combination of a platen, a type-bar having a plurality of types whose printing faces are inclined backwardly and outwardly from a point intermediate and forward of the types, and means for shifting the type bar and platen relatively one to the other for upper and lower case printing and so that the impact between the types and platen will be above and below horizontal planes extending through the axis of revolution of said platen when the platen and types are in different relative case positions.

4. In a typewriting machine, the combination of a type bar having a plurality of types, a platen, and means for shifting said platen to change the case position thereof and for moving that portion of said platen opposite the printing center to a greater extent than that portion which is adjacent to the printing center.

5. In a typewriting machine, the combination of a platen, a type bar having a lower case type and an upper case type, and means for shifting the platen and type bar relatively one to the other, to change the case position, and so that the impact of the lower case type on the platen will be above a horizontal plane passing through the axis of revolution of the platen and so that the impact of the upper case type on the platen will be below a horizontal plane passing through the axis of revolution of the platen in the different relative case positions of the type bar and platen.

6. In a typewriting machine, the combination of a cylindrical platen, a type bar having a plurality of types, and means for shifting said platen for upper and lower case printing, and so that the impact between one type on the carrier and the platen will be above a horizontal plane extending through the axis of revolution of the platen and so that the impact between another type on the carrier and the platen will be below a horizontal plane extending through the axis of the platen, said shifting means moving the printing side of the platen a less distance than any other portion of the platen.

7. In a typewriting machine, the combination of a cylindrical platen, a type bar having a plurality of types, the faces of which are inclined backwardly and outwardly and impact with the platen in planes that are at angles to a horizontal and also to a vertical plane, and means for shifting said platen and moving the printing face thereof a less distance than the opposite portion of the platen.

8. In a typewriting machine, the combination of a type-bar having a plurality of types whose faces are inclined to each other as shown, a cylindrical platen, and means for simultaneously shifting said platen bodily and rotatively.

9. In a typewriting machine, the combination of a platen, a type bar having a plurality of type faces which are inclined outwardly from the middle of the type block and backwardly toward the base thereof, and means for shifting the platen and type bar relatively one to the other and so that the impact of one type on the platen will be above a horizontal plane passing through the axis of revolution of the platen when the parts are in one case position and so that the impact of another type on the platen will be below a horizontal plane passing through the axis of revolution of the platen when the parts are in another case position.

10. In a typewriting machine, the combination of a platen, and a system of type bars, each type bar having two types on a block, the type faces being inclined relatively to each other and from the middle of the block outwardly and backwardly toward the base thereof and one of said types being situated in the plane of movement of the type bar and the other being offset therefrom.

11. In a typewriting machine, the combination of a platen, a series of type bars having each two types, whose printing faces are inclined rearwardly and outwardly from a point intermediate the types, and at least one of the types of each pair being situated in the plane of movement of its bar, and the other type on each bar being off-set as the sides of the system are approached.

12. In a typewriting machine, the combination of a platen, a series of straight type bars, considered with relation to their planes of movement, an upper case type and a lower case type whose printing faces impact with the platen in different planes that are at angles to a horizontal plane, said type faces on each bar being inclined forwardly from the outer extremities thereof toward a point intermediate of and in front of said types, and the lower case type on each carrier being situated in the plane of movement of its bar.

13. A type member consisting of a stem, a bed or block partially offset from said stem, a type on said block and arranged directly over said stem and a second type arranged on the offset portion of said block, both of said types having faces which incline in opposite directions and rearwardly and outwardly.

14. In a typewriting machine, the combination of a platen, a platen frame which moves on two centers during the shifting thereof from one case position to another, one of said centers being coincident with the axis of the platen, the platen partaking of said movement, and means for shifting said platen frame about said centers.

15. In a typewriting machine, the combination of a platen, a platen frame which swings on two centers during the shifting thereof from one case position to another, one of said centers being coincident with the axis of the platen, means for maintaining a fixed relation between the platen and its frame during the shifting movement, and means for shifting said platen frame about said centers.

16. In a typewriting machine, the combination of a platen, a platen frame which swings on two centers during the shifting thereof from one case position to another, one of said centers being coincident with the axis of the platen, means for maintaining a fixed relation between the platen and its frame during the shifting movements, means for shifting said platen frame, and a series of type bars each having a plurality of types which have inclined faces that are adapted to impact with the platen.

17. In a typewriting machine, the combination of a platen, a platen frame which is adapted to swing on the axis of the platen during the case shifting movement of the platen frame, and case shifting means for shifting said platen frame.

18. In a typewriting machine, the combination of a platen, a platen frame which is adapted to swing on the axis of the platen during the case shifting movement of the platen frame, means for maintaining a fixed relation between the platen and platen frame during the shifting movements, and case shifting means for shifting said platen frame.

19. In a typewriting machine, the combination of a carriage, a platen, a platen frame which is adapted to swing on the axis of the platen during the case shifting movement of the platen frame, links which are pivoted to said platen frame and to the carriage and on which said frame is adapted to swing during its case shifting movement, means for maintaining a fixed relation between the platen and platen frame during the case shifting movements, and case shifting means for shifting said platen frame.

20. In a typewriting machine, the combination of a carriage having end plates with curvilinear recesses therein, a platen frame having curved end plates adapted to move in the said recesses in the end plates of the carriage and in paths that conform substantially to the curves of the end plates of the platen frame, a platen, and means for shifting said platen frame.

21. In a typewriting machine, the combination of a carriage having end plates with curvilinear recesses therein, a platen frame having curved end plates adapted to move in the said recesses in the end plates of the carriage, means for shifting said platen frame, stops carried by the platen frame, and coöp- erating abutments on the carriage to limit the movements of the platen frame in its shifting movements.

22. In a typewriting machine, the combination of a platen frame, a shift roller and rail, key-actuated means for moving said shift roller and rail to effect a transverse movement of the platen, and a universal joint for connecting the shift roller to the part which carries it.

23. In a typewriting machine, the combination of a carriage, a platen frame and a roller carried thereby, a ball-and-socket joint for the roller, a shift rail carried by the frame of the machine and adapted to act on said roller, and key actuated means for moving the shift rail.

24. In a typewriting machine, the combination of a carriage, a platen, a platen shaft or axis, a platen frame, links pivoted to the carriage and pivotally connected to the shaft or axis of the platen, another link or arm connected to the platen frame and case shifting means for vibrating the last named link or arm to change the case position of the platen.

25. In a typewriting machine, the combination of a carriage, a platen, a platen shaft or axis, a platen frame, links pivoted to the carriage and pivotally connected to the shaft or axis of the platen, another link connected to the platen frame, a pivot or rock shaft for said last named link, an arm extending from said pivot or rock shaft, a shifter bar, and means for actuating said shifter bar.

26. In a typewriting machine, the combination of a series of type bars having each an upper case type and a lower case type and the faces of the types being inclined as shown, a carriage, a platen, a platen shaft, a platen frame in which said shaft is journaled, links pivoted at their outer ends to the carriage and pivotally connected at their inner ends to the platen shaft, another link pivoted at one end of the carriage and at the other end to the platen frame, an arm extending from said pivot at the carriage, a shifter bar cooperating with said arm, and key mechanism for actuating said shifter bar.

27. In a typewriting machine, the combination of a series of type bars having each an upper case type and a lower case type, the faces of the types being inclined as shown, a carriage, a platen, a platen shaft, a platen frame in which said shaft is journaled, links pivoted at their outer ends to the carriage and pivotally connected at their inner ends to the platen shaft, a rock shaft on said carriage, another link connected to said rock shaft and to the platen frame, an arm projecting from said rock shaft and having a roller, a shifter bar or plate pivotally mounted in the framework of the machine and co-operating with said roller, a shift key, and connections from said shift key to said shifter bar or plate.

28. In a typewriting machine, the combination of a carriage, a platen frame, a platen shaft, a platen, a set of links pivoted to the carriage at their outer ends and embracing the platen shaft at their inner ends, a second set of links pivoted to the carriage at their outer ends and pivotally connected at their inner ends to the platen frame and means for moving the last mentioned set of links to shift the platen transversely, the construction and arrangement being such that when the shift takes place, the platen frame moves bodily and also rotatably about the platen shaft and causes the platen to move transversely and rotatably and so that the transverse movement of the platen is less on its printing side than at any other portion thereof.

29. In a front-strike typewriting machine, the combination of a platen; a series of pivoted type carriers arranged in segmental form and having their pivots all parallel to an upright plane extending longitudinally through the axis of the platen, pivots of adjacent type bars at and near the middle of the series being in a single plane which extends at right angles to the length of the type bars whereas the pivots of type bars near the ends of the series are at progressively greater distances from said upright plane; and key actuated means for operating said type bars.

30. In a front-strike typewriting machine, the combination of a platen; a series of pivoted type carriers arranged in the form of a segment and having their pivots all parallel to an upright plane extending longitudinally through the axis of the platen, the pivots of the type carriers at the ends of the segment being stepped progressively toward said plane through the platen; and key actuated means for operating said type carriers.

31. In a typewriting machine, the combination of a system of pivoted type bars arranged in segmental form and having their pivotal centers in a single row that is at an angle to the plane of the segment.

32. In a typewriting machine, the combination of a system of pivoted type carriers which normally are horizontally disposed and which are arranged in segmental form and have their pivots arranged substantially in a single plane which is inclined to the vertical, and key-actuated means for operating said type carriers.

33. In a front strike typewriting machine, the combination of a platen, a type bar support, and type bars pivoted thereon, the line of the pivots being segmental and the end portion only of the line of pivots having an upward and backward inclination toward the face of the platen.

34. In a front strike typewriting machine, the combination of a platen, a system of pivoted type carriers, the pivots of which are arranged in a compound curve and are at progressively greater distances from the printing side of the platen as the center of the compound curve is approached, and key actuated means for operating said type carriers.

35. In a front strike typewriting machine, the combination of a platen, a system of segmentally and substantially horizontally disposed pivoted type carriers, the pivots of which are arranged substantially in a single inclined plane and are at progressively greater distances from a vertical plane extending through the axis of the platen as the center of the system is approached, and key actuated means for operating said type carriers.

36. In a front strike typewriting machine, the combination of a platen, a system of pivoted segmentally arranged type carriers having their pivots situated substantially in a single inclined plane and at progressively greater distances from the front face of the platen, and a series of key actuated bell-crank levers operatively connected to said type carriers, the two arms of each of said levers being of substantially the same length.

37. In a typewriting machine, the combination of a system of segmentally and substantially horizontally arranged pivoted type carriers, the pivots of which are arranged substantially in a single plane at an angle to a vertical plane, and a series of key actuated bell crank levers operatively connected to said type carrier, the two arms of each of said levers being of substantially equal length.

38. In a front-strike typewriting machine, the combination of a platen, a type bar segment, a system of type bars that are mounted with their pivots in a step-shape arrangement on said segment such that the pivots of certain of the type bars are in different parallel planes which extend at right angles to the length of the type bars when said type bars are in their normal positions, the pivots of the type bars at the ends of the system being nearer the rear of the machine than any of the pivots of the other type bars of the system, and key actuated means for operating the type bars.

39. In a front-strike typewriting machine, the combination of a platen, a type bar segment, a system of type bars that are mounted on the segments with certain of their pivots in a step-shape arrangement fore and aft of the machine and transversely of the segment, said pivots near the ends of the system being arranged nearer the rear of the machine than any of the other pivots of the system of type bars, and key actuated levers for operating said type bars.

40. In a front strike typewriting machine, the combination of a platen, a type bar segment, a system of type bars that are substantially horizontally disposed when in the normal position and are all mounted in a continuous segmental row on the forward face or side of said segment in different planes fore and aft of the machine, and key actuated means for operating said type bars.

41. In a typewriting machine, the combination of a platen, a continuous system of type bars, the pivots of which are in a single row and in different parallel planes that are at different distances from the printing point, and key actuated means for moving said type bars.

42. In a typewriting machine, the combination of a platen, a type bar segment, a system of type bars secured thereto in different parallel planes that are at different distances from the printing face of the platen, the pivots of the type bars being in a single row and those at the terminals of the segment being in a plane that is adjacent the platen and the pivots of the type bars at the middle of the segment being in planes farther removed from the platen, and key actuated means for moving said type bars.

43. In a typewriting machine, the combination of a platen, a type bar segment having at its ends only step-shaped faces, the steps of the faces being in different parallel planes at different distances from the printing face of the platen, hangers secured to said steps, type bars of uniform length pivoted to said hangers, and key actuated means for operating the type bars.

44. In a front strike typewriting machine, the combination of a platen, a system of type bars which are adapted to strike upwardly and rearwardly, a type bar segment, means for mounting said type bars on the forward face of said segment and in different transverse vertical planes, the terminal type bars of the system having their pivots in the vertical planes nearest the printing point and the pivots of other type bars being situated in different planes which are farther from the printing point as the type bars progress toward the center of the system, and key actuated means for operating said type bars.

45. In a front strike typewriting machine, the combination of a platen, a system of type bars of uniform length which are adapted to strike upwardly and rearwardly, a vertically-arranged type bar segment, type bar hangers, means for mounting said hangers on the forward face of said segment and in different vertical planes and so that the terminal type bars of the system will have their pivots situated in the vertical plane nearest the printing point and the pivots of other type bars will be situated in different planes which are farther from the printing point as the type bars progress toward the center of the segment, links connected to said type bars, and key actuated bell crank levers connected to said links.

46. In a front strike typewriting machine, the combination with a platen, of a system of pivoted type bars of uniform length arranged in segmental form and terminating at their type ends at different distances from a plane passing through the axis of the platen, the type bars at the sides of the system being nearest said plane.

47. In a front strike typewriting machine, the combination with a platen, of a system of substantially horizontally disposed pivoted type bars of uniform length arranged in segmental form and having a downwardly and outwardly step-shaped arrangement at their type ends from the upper to the lower portions of the system.

48. In a front strike typewriting machine, the combination with a platen, of a system of substantially horizontally disposed type bars of substantially uniform length segmentally arranged and terminating at their type ends in different transverse vertical planes, the type ends of a number of adjacent type bars at the center of the system being in substantially the same plane and those at the sides of the system being in planes that are at progressively greater distances from said plane of the type ends at the center of the system as the terminal type bars of the system are approached.

49. In a typewriting machine, the combination of a series of segmentally arranged type bars, and a series of bell crank key levers operatively connected to the type bars, said bell crank key levers being of progressively greater lengths from the center to the sides of the segment and the parts being constructed and arranged to afford a substantially uniform leverage on the various actions.

50. In a typewriting machine, the combination of a series of type bars, and a series of bell crank key levers operatively connected to the type bars, the lever arms on each bell crank extending to substantially equal distances from the fulcrum thereof.

51. In a typewriting machine, the combination of a series of segmentally arranged type bars, a series of bell crank levers operatively connected to the type bars, finger keys carried by said bell crank levers, and means for mounting said levers at different points fore and aft of the machine, the levers being of progressively greater lengths from the center to the sides of the segment and the parts being constructed and arranged to afford a substantially uniform leverage on the various actions.

52. In a typewriting machine, the combination of a series of type bars, a series of bell crank levers operatively connected to the type bars, the levers being mounted at different heights and the lever arms of each bell crank extending to substantially equal extents from the fulcrum thereof, and finger keys carried by said bell crank levers.

53. In a typewriting machine, the combination of a series of type bars, a series of bell crank levers operatively connected to the type bars, the lever arms of each bell crank extending to substantially equal extents from the fulcrum thereof, means for mounting said levers at different points fore and aft of the machine and at different heights, and finger keys carried by said bell crank levers.

54. In a typewriting machine, the combination of a series of segmentally arranged type bars, a series of coöperating bell crank levers which are adapted to vibrate fore and aft of the machine and the lever arms of each of which extend to substantially equal extents from the fulcrum thereof, means for mounting said levers at different points fore and aft of the machine and at different heights, and finger keys carried by said bell crank levers.

55. In a typewriting machine, the combination of a series of segmentally arranged type bars, a series of coöperating bell crank levers which are adapted to vibrate fore and aft of the machine and the lever arms of each of which extend to substantially equal extents from the fulcrum thereof, said levers being progressively longer as they extend from the center to the sides of the series of segmentally arranged type bars, and means for mounting said levers at different points fore and aft of the machine and at different heights.

56. In a typewriting machine, the combination of a series of segmentally arranged type bars, a series of links connected thereto, a series of parallel bell crank levers connected to said links and each having arms of substantially equal length, said levers being progressively longer as they extend from the center to the sides of the series of segmentally arranged type bars, and finger keys carried by said bell crank levers.

57. In a typewriting machine, the combination of a platen, a series of segmentally arranged type bars, each of which is provided with a plurality of types and a series of key actuated bell crank levers operatively connected to the type bars, said bell crank levers being progressively longer as they extend from the center to the sides of the segment, the parts being constructed and arranged to afford a uniform leverage on the various actions, and means for shifting said platen and type bars relatively one to the other.

58. In a typewriting machine, the combination of a platen, a series of segmentally arranged type bars, each of which is provided with a plurality of types having inclined printing faces and a series of key actuated bell crank levers operatively connected to the type bars, the lever arms of each bell crank extending to substantially equal extents from the fulcrum thereof, and means for shifting said platen and type bars relatively one to the other.

59. In a typewriting machine, the combination of a platen, a series of type bars, a series of bell crank levers operatively connected to the type bars, the lever arms of each bell crank extending to substantially equal extents from the fulcrum thereof, a plurality of types on each type bar, the faces of which impact with the platen in different planes that are angles to a horizontal plane, the said faces being inclined forwardly from the outer extremities thereof toward a point intermediate and in front of said types, and means for shifting the platen and type bars relatively one to the other.

60. In a typewriting machine, the combination of a platen, a series of type bars, a series of bell crank levers operatively connected to the type bars, the lever arms of each bell crank extending to substantially equal extents from the fulcrum thereof, a plurality of types on each type bar, the faces of which impact with the platen in planes that are at angles to a horizontal plane, the said faces being inclined forwardly from the outer extremities of each of the types toward a point intermediate and in front of said types, and means for shifting the platen, the center of rotation of said platen receiving a greater extent of movement than that portion thereof which is at and adjacent to the printing point.

61. In a typewriting machine, the combination of a system of levers whose movements are measured by angles decreasing in size from the middle to the sides of the system, and a universal bar movable by the levers to actuate the carriage-feed mechanism, said combination including means to equalize the movements imparted to the bar by means of the levers.

62. In a typewriting machine, the combination of a system of key-actuated levers whose movements are measured by different angles, and carriage-feed mechanism on which each lever acts from the beginning to the end of the movement imparted to the lever by the depression of its key, said combination including means to equalize the movements imparted by means of the levers to a portion of the carriage-feed mechanism.

63. In a typewriting machine, the combination of a system of key-actuated levers whose movements are measured by different angles, and carriage-feed mechanism comprising a universal bar on which each lever acts from the beginning to the end of the movement imparted to the lever by the depression of its key, said combination including means to equalize the movements imparted by the levers to the universal bar.

64. In a typewriting machine, the combination of a system of upwardly-extending type bar actuating lever arms whose movements are measured by angles decreasing in size from the middle to the sides of the system, and a universal bar operative by said lever arms acting on the bar at elevations which increase from the middle to the sides of the system of lever arms, the bar being connected to a pair of parallel links which are pivoted to a fixed support.

65. In a typewriting machine, the combination of a system of upwardly extending type bar actuating lever arms increasing in length from the middle to the sides of the system, and a universal bar operative by said levers acting on the bar at elevations which increase from the middle to the sides of the system of lever arms, the bars being connected to a pair of parallel links or arms.

66. In a typewriting machine, the combination of a system of upwardly extending type bar actuating lever arms increasing in length from the middle to the sides of the system, keys for actuating said upwardly extending lever arms, and a curved universal bar coöperating with said lever arms.

67. In a typewriting machine, the combination of a system of angular key levers having upright arms that increase in height at their upper ends from the center to the sides of the system, and a curved universal bar that coöperates with the upright arms of said levers.

68. In a typewriting machine, the combination of a system of type bar actuating levers have different angular movements, and a univeral bar that contacts with said levers in the initial position thereof and which is moved a uniform distance by all of said levers.

69. In a typewriting machine, the combination of a system of angular type bar actuating levers that have different angular movements, and a universal bar that coöperates with one set of arms of said angular levers and which is taken up at a uniform period in the actuation of all of the different levers and is moved a uniform distance by all of said levers.

70. In a typewriting machine, the combination of a system of angular key levers that have different angular movements, and a universal bar which coöperates with one set of arms of said angular key levers and which is taken up at a uniform period in the actuation of all of the different levers and is moved a uniform distance by all of said levers 71. In a typewriting machine, the combination of a system of angular key levers having upright arms that increase in height at their upper ends from the center to the sides of the system, both arms of each key lever being substantially the same length, and a curved universal bar that coöperates with the upright arms of said levers.

72. In a typewriting machine, the combination of a system of type bar actuating levers that have different angular movements, both arms of each type bar actuating lever being substantially the same length, and a universal bar that contacts with said levers in the initial position thereof and which is moved a uniform distance by all of said levers.

73. In a typewriting machine, the combination of a system of angular type bar actuating levers that have different angular movements, both arms of each type bar actuating lever being substantially the same length, and a universal bar that coöperates with one set of arms of said angular levers and which is moved a uniform distance by all of said levers.

74. In a typewriting machine, the combination of a system of angular key levers that have different angular movements, both arms of each of said angular key levers being substantially the same length, and a universal bar which coöperates with one set of arms of said angular key levers and which is moved a uniform distance by all of said levers.

75. In a typewriting machine, the combination of a system of type bar actuating levers that have different angular movements, the arms of the levers increasing in length from the center to the sides of the system and both arms of each lever being substantially the same length, and a curved universal bar that contacts with said levers in the initial position thereof and which is moved a uniform distance by all of said levers.

76. In a typewriting machine, the combination of a system of angular type bar actuating levers that have different angular movements, the arms of the levers increasing in length from the center to the sides of the system and both arms of each lever being substantially the same length, and a curved universal bar that coöperates with one set of arms of said angular levers and which is moved a uniform distance by all of said levers.

77. In a typewriting machine, the combination of a system of angular key levers that have different angular movements, the arms of the angular key levers increasing in length from the center to the sides of the system and both arms of each angular key lever being substantially the same length, and a curved universal bar which coöperates with one set of arms of said angular key levers and which is moved a uniform distance by all of said levers.

78. In a typewriting machine, a system of radial type bars pivoted in a skewed arc, the ends of the arc being inclined away from the type bar system, and the type ends of the bars lying in a correspondingly skewed arc whose ends incline toward the type bar system.

79. In a typewriting machine, a system of radial type bars pivoted in a skewed arc, the ends of the arc being inclined away from the type bar system, and the type ends of the bars lying in a correspondingly skewed arc whose ends incline toward the type bar system, and a multiple type upon the end of each type bar; said types lying at gradually increasing angles to the type bars from the center to the sides of the system, and overlapping one another at the sides of the system, and each being slightly staggered with relation to the next by reason of the skewing of the pivot arc.

80. In a typewriting machine, a system of radial type bars of approximately equal length pivoted in a skewed arc, the ends of the arc being inclined away from the type bar system, and the type ends of the bars lying in a correspondingly skewed arc whose ends incline toward the type bar system, and a multiple type upon the end of each type bar, said types lying at gradually increasing angles to the type bars from the center to the sides of the system, and overlapping one another at the sides of the system, each being slightly staggered with relation to the next by reason of the skewing of the pivot arc, and said type bars being mounted at approximately equal intervals throughout the system.

81. In a front strike writing machine, a system of rearwardly striking radial type bars pivoted in a skewed arc, said arc inclining rearwardly at its ends, each bar carrying a multiple type, the types lying at gradually increasing angles to the bars from the center to the sides of the system, and overlapping one another at the sides of the system, and each type from the center portion to the sides of the system lying slightly in rear of the preceding type.

82. In a typewriting machine, a series of segmentally arranged type bars that are horizontally disposed when at rest, and the pivotal centers of which are situated substantially in an inclined plane.

83. In a typewriting machine, a series of segmentally arranged type bars that are horizontally disposed when at rest, and the pivotal centers of which are situated substantially in an inclined plane that extends upwardly and rearwardly from the pivotal centers of the type bars at the center of the series.

84. In a typewriting machine, a series of segmentally arranged type bars that are substantially horizontally disposed when at rest, and the pivotal centers of which are arranged at progressively greater distances from a vertical plane coincident with the front face of the platen as the center of the series of type bars is approached.

85. In a typewriting machine, the combination of a platen and a series of segmentally arranged substantially horizontally disposed type bars having the pivots near the terminals of the series drawn back toward the platen and with reference to the pivots of the type bars at the center of the series and so as to draw back the types of said terminal type bars and thus provide greater clearance for said types.

86. In a typewriting machine, the combination of a series of type bars, a series of key-actuated upright lever arms for actuating said type bars, and a curved universal bar with which said lever arms co-act at different elevations.

87. In a typewriting machine, a series of segmentally arranged type bars, the terminal type bars of the series being pivoted rearwardly of a plane extending through the pivots of the center bars of the series and at right angles to the length of said bars.

Signed at the borough of Manhattan, city of New York, in the county of New York and State of New York, this third day of April A. D. 1902.

ALEXANDER T. BROWN.

Witnesses:
K. V. DONOVAN,
E. M. WELLS.